UNITED STATES PATENT OFFICE.

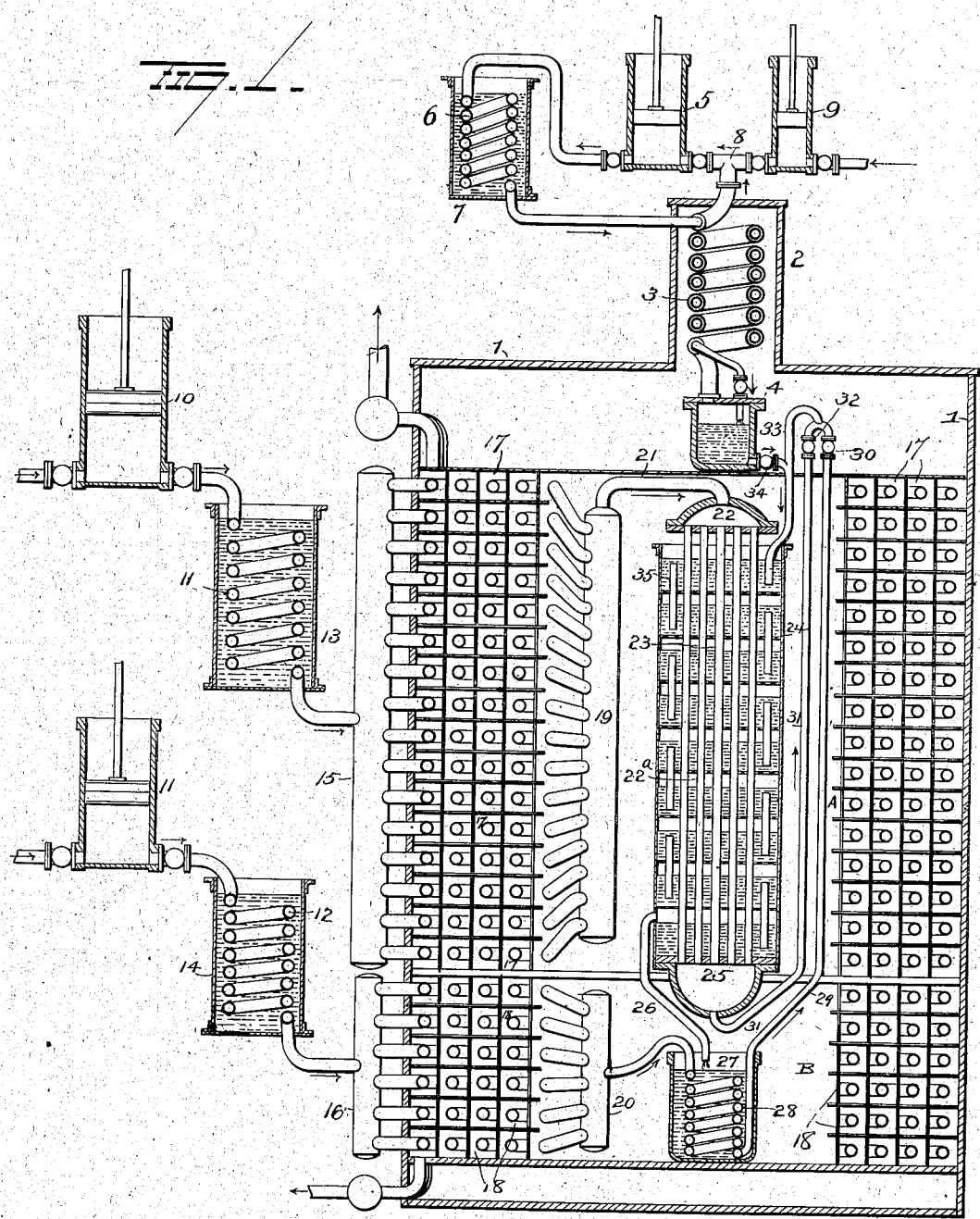

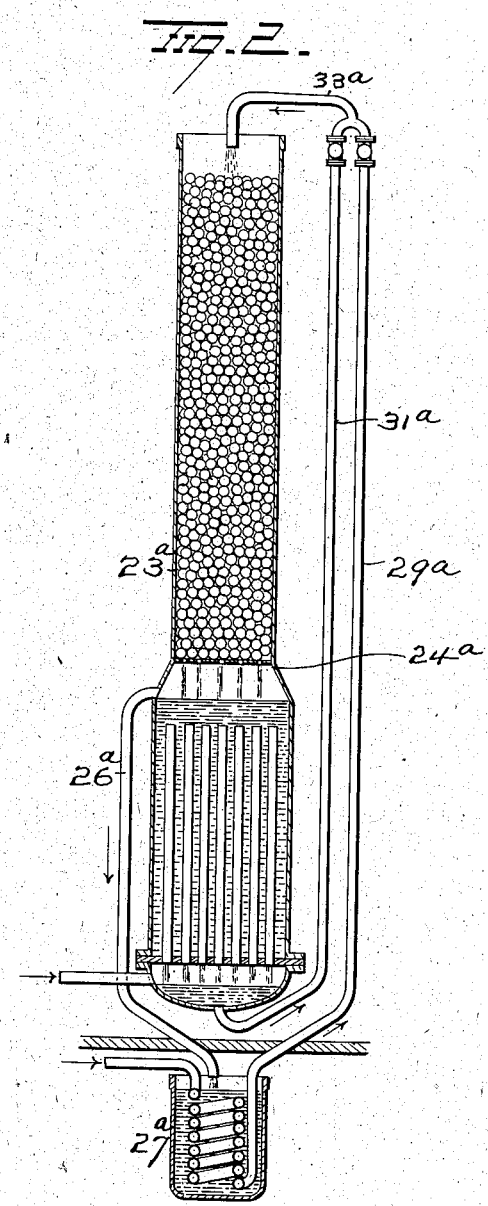

CARL LINDE, OF MUNICH, GERMANY, ASSIGNOR OF ONE-THIRD TO CHARLES F. BRUSH, OF CLEVELAND, OHIO.

APPARATUS FOR LIQUEFYING GAS AND SEPARATING ITS ELEMENTS.

No. 815,544.    Specification of Letters Patent.    Patented March 20, 1906.

Application filed November 7, 1902. Serial No. 130,427.

*To all whom it may concern:*

Be it known that I, CARL LINDE, of Munich, Kingdom of Bavaria, and Empire of Germany, have invented certain new and useful Improvements in Apparatus for Liquefying Gas and Separating its Elements; and I do hereby declare the following to be a full, clear, and exact description of the invention, such as will enable others skilled in the art to which it appertains to make and use the same.

My invention relates to an improved apparatus for liquefying gas and separating its component parts, the object of the invention being to provide improvements which will permit air or gas to be liquefied and distilled into its constituents having any desired proportion of the elements thereof and in which apparatus the heat for distilling the liquid is furnished by the compressed gas cooled in the counter-current by the products of evaporation.

A further object is to provide improvements of this character which will compel the products of distillation of liquefied air richer in oxygen to pass through liquid poorer in oxygen and deposit therein a portion of its oxygen, replacing the oxygen which it has deposited with nitrogen, so enriching the liquid with oxygen and carrying off the nitrogen, thus permitting the liquid or its gas when evaporated to contain any proportion of oxygen desired.

The process protected by United States Patent No. 727,650 for the liquefaction and fractional evaporation of atmospheric air consists, essentially, in this, that compressed air condenses, while evaporating an equal quantity of liquid air boiling under atmospheric pressure, from which it is separated by metal walls. The condensed product streams through a valve into the evaporating-chamber. The products of the progressive evaporation, which contain at first chiefly nitrogen, and later on more and more oxygen, can be caught up separately, and in this way gas mixtures of any desired composition obtained. The compressed air exchanges its temperature with the gases obtained in the counterflow apparatus. As soon, therefore, as the evaporating apparatus is filled with liquid air and the counterflow apparatus is in action the normal fall of temperature is established. Then with a theoretically perfect carrying out of the process the apparatus should be operated without any removal of heat at any point and without limit as long as air is fed in at sufficient pressure to produce the difference of boiling temperature necessary for the transfer of heat. The unavoidable imperfections of the exchange of heat and of the insulation against heat conduction and radiation from the surroundings produce loss of cold, which must be made up for by a corresponding supply of cold. For this purpose there is employed the refrigeration which arises on the outflow of compressed air at higher to lower pressure in consequence of the performance of internal work. In this case we can proceed in this way, that we bring the whole of the mass of air to be subjected to fractioning under moderate pressure (say twenty atmospheric pressures) and employ the refrigeration produced by flowing out into atmospheric pressure to cover the loss of cold, or we may let a correspondingly-smaller quantity of air circulate between high pressures (say fifty and two hundred atmospheres) while the air to be fractioned is brought only to the above-mentioned excess of pressure necessary for the heat transfer. This latter form is the basis of the present invention and will now be described in detail.

In the accompanying drawings, Figure 1 is a sectional view illustrating my improvements; and Fig. 2 is a sectional view illustrating a form of rectifier which might be employed, if desired.

1 represents a casing of any suitable material provided with a dome 2, inclosing a counter-current double coil 3, comprising one coiled pipe within the other, the inner pipe projecting down into an expansion-chamber 4 and the outer or larger pipe communicating with the top thereof. 5 represents an air-compressor for forcing compressed air through a pipe 6, coiled in a cooling-liquid chamber 7 and connected with the internal pipe of the counter-current coil. The upper end of the larger pipe of said coil 3 communicates with the inlet-pipe 8 of compressor 5 to form a continuous circuit for the air. Another compressor 9 is provided to replace air removed from the circuit as a liquid. The purpose of the construction above described is to furnish liquid air to make up deficiencies in the distilling process, which will now be described.

The casing 1 is divided by a partition into two chambers A and B, the upper chamber A being preferably larger than the lower chamber B.

10 and 11 represent air-compressors for forcing air through coils 11 and 12, located in cooling-baths 13 and 14, respectively. From the coils the air passes into distributers 15 and 16, which distribute it through a series of independent horizontal coils inclosed within coils of larger pipe, forming counter-current apparatus 17 and 18, which comprises a series of independent horizontal coils, each pipe coiling inside its first turn, and so on, forming an inner contracted insulated chamber, the coils growing colder as they approach the inner ends of the pipes, as will be hereinafter understood, owing to their near approach to the source of cold and their insulation from the outside. The inner ends of these air-supply pipes communicate with accumulators 19 and 20, and the former is connected by a pipe 21 with a chamber 22 at the top of my improved distiller or rectifier 23, which in the form shown in Fig. 1 is a column or high cylinder with a large number of intermediate bottoms 24, of perforated sheet metal. It is traversed by a large number of vertical tubes $22^a$, that communicate at their upper ends with chamber 22 and at their lower ends with a similar chamber 25. The lower pan or section of the rectifier is connected by a pipe 26 with an open vessel 27 for conveying the liquid rich in oxygen thereto, and in this vessel the vaporization of this rich oxygen takes place, due to heat supplied to the liquid by a coil 28 in the vessel supplied with compressed air by accumulator 20, previously cooled in the counter-current apparatus 18. The air is liquefied by its passage through coil 28 and passes up through pipe 29, having a valve 30 therein, and makes juncture with a pipe 31 from lower chamber 25, also having a valve 32 therein, and the liquid air in pipes 29 and 31 flows through a common pipe 33 and empties into the top pan of the rectifier. A short valved pipe 34 connects the chamber 4 with this pipe 33 to supply such liquid air thereto as may be necessary to make up for any loss of cold in the distilling apparatus, as before explained. The pans of the distiller are connected by short pipes 35, extending from the liquid-level in an upper pan to a point below the liquid-level of the next below, and so on to the bottom pan, so that each upper pan will overflow into the next lower, and so on to the bottom, thus making up for the losses of liquid by evaporation.

I have thus provided counter-current apparatus 17 and 18, which guarantees the most perfect insulation possible. They consist of a number of coils laid side by side, each coil wound in one plane of pipes surrounded by similar channels. The channel convolutions of each coil are insulated from each other. Each run of coils protects the next one inside, whose temperature is only moderately lower, against taking up heat from the outside, and the innermost coldest winding protects the distilling or rectifying apparatus, whose temperature is about $-190°$ centigrade. In order to obtain a perfect fractioning, the principle of rectification is applied, allowing the vapors richer in oxygen to pass through the poorer liquid. Corresponding to the partial pressures they in this case give up oxygen to the liquid and take up nitrogen instead; but we must and do provide something further—namely, an arrangement which renders it possible to furnish heat to the boiling liquid by the condensation of compressed air previously cooled in the apparatus.

The operation is as follows: The pans of the distiller or rectifier and of the oxygen-evaporating vessel 27 are filled with liquid. The air compressed by compressors 10 and 11 is brought in the coolers 12 and 13 to the cooling-water temperatures and then goes into the coils of the counter-current apparatus 17 and 18. It is cooled off therein by the products of evaporation of the boiling liquid and flows into the accumulators 19 and 20. From 19 it goes into the upper chamber 22 and condenses in vertical tubes $22^a$, while bringing an equal mass of liquid in the pans to evaporation. The products of condensation collect below in chamber 25 and are carried up pipe 31 through valve 32 into pipe 33 and empty into the upper pan. The compressed air in accumulator 20 passes through coil 28, is condensed therein, evaporating a corresponding quantity of liquid, and flows up pipe 29, through valve 30 and pipe 33, into the top pan. The liquid carried to this upper pan has the composition of the atmosphere, (twenty-one per cent. oxygen and seventy-nine per cent. nitrogen.) The evaporation products, however, contain at first essentially the more volatile constituent—the nitrogen—so that the liquid becomes richer in oxygen. From the first to the second pan, therefore, there flows over a liquid that contains already considerably more than twenty-one per cent. of oxygen. The enrichment progresses from pan to pan, and the content in oxygen can be driven as high as desired in the lowest pan. While the content of oxygen increases from above downward, at the same time the partial pressure of the oxygen increases, and consequently the oxygen content of the vapor developed. In order now to win back the oxygen vapors developed in the lower pans, we allow the evaporation products of the lower pans to stream through the perforated bottoms of the pans above. While in this case the vapors come into contact with liquid of diminishing oxygen content, they give, corresponding to the diminishing partial pressure of the oxygen, a part of the same to the liquid and abandon the column at the top with a very small oxygen content. Therefore only a small part of the oxygen contained in the compressed air goes off with the nitrogen—i. e., the output of gas rich in oxygen is improved—and this is one advantage derived from the present invention. The remainder of the liquid rich in oxygen flows from the lowest pan of the rectification-column to the oxygen-evaporator below and is there completely evaporated, (vaporized.) All the products of evaporation take their course through the channels of the counter-current apparatus 17 and 18 and exchange their temperature with air circulating in the coils, so that they abandon the separating apparatus with a temperature only a little below that of the cooling-water. For covering the losses of cold there is fed to the distilling apparatus through the pipe 34 the liquid air produced above. The liquid boiling in the upper part has a somewhat lower temperature than the liquid in the oxygen-evaporator on account of the higher oxygen content of the latter. The air that is to condense in the coil must, therefore, be brought to a somewhat higher pressure than the air to be liquefied in the tubes of the column. This is the reason why two compressors 10 and 11 are used. By choice of conditions of the masses of air furnished by the two compressors and the exchange and condensation surfaces we have it in hand to vary the oxygen content of the gas produced within wide limits.

Fig. 1 shows a very special form of apparatus. It is clear that the counter-current apparatus, as well as the rectifier and the oxygen-evaporator, can have very different shapes. It is essential that heat is brought to the liquid by compressed air previously cooled.

Let us now point to a special form of column that can here very well find application, which consists of a cylindrical vessel 23ª without intermediate bottoms entirely filled with beads. This form is shown in Fig. 2. The heating of the rectifier by compressed air occurs here below the wire-gauze 24ª, carrying the beads in a cylindrical vessel, in which there are applied the largest possible surfaces. The product of condensation produced here and in the oxygen-evaporator 27ª below it is conducted through tubes 29ª and 31ª to the tube 33ª onto the beads at the top and trickles slowly downward through them. The liquid in the vessel below the beads has already the oxygen content of the desired gas mixture. An overflow 26ª continuously carries from here the liquid rich in oxygen down into the oxygen-evaporator. The vapors developed in the upper vessel have a considerable oxygen content, as they arise from the liquid rich in oxygen. While the vapors are rising through the beads they come into contact with liquid less rich in oxygen, and therefore exchange the greater part of their oxygen content with the same for nitrogen. They abandon the column with approximately the oxygen content that corresponds to the partial pressure of the oxygen in the liquid fed in at the top.

Various changes may be resorted to in the relative arrangement of parts shown and described without departing from the spirit and scope of my invention. Hence I would have it understood that I do not wish to confine myself to the exact construction of parts shown and described; but, Having fully described my invention, what I claim as new, and desire to secure by Letters Patent, is—

1. In an apparatus for liquefying gas and separating its constituent parts, the combination with a distilling-chamber, of a vessel into which the less volatile liquefied gas from the distilling-chamber flows, a counter-current apparatus surrounding said vessel and having an outlet for the products of evaporation of the distilled liquid in said vessel, a similar counter-current apparatus around the distilling-chamber having an outlet for the products of evaporation therefrom, pipes for conveying compressed gas from the counter-current apparatus through the liquid in the distilling-chamber and vessel to boil the same and condense or liquefy the gas, and means for conveying said liquefied gas in both pipes into the distilling-chamber.

2. In an apparatus for liquefying gas and separating its constituent parts, the combination with a distilling-chamber, of a vessel into which the less volatile liquefied gas from the distilling-chamber flows, a counter-current apparatus surrounding said vessel and having an outlet for the products of evaporation of the distilled liquid in said vessel, a similar counter-current apparatus around the distilling-chamber having an outlet for the products of evaporation therefrom, pipes for conveying compressed gas from the counter-current apparatus through the liquid in the distilling-chamber and vessel to boil the same and condense or liquefy the gas, and means for conveying said liquefied gas in both pipes into the distilling-chamber, and means for supplying liquefied gas to the distilling-chamber to make up for loss of cold.

In testimony whereof I have signed this specification in the presence of two subscribing witnesses.

CARL LINDE.

Witnesses:
W. BOWMAN,
CLARA I. PARKER.